United States Patent [19]
Wang et al.

[11] Patent Number: 6,076,951
[45] Date of Patent: Jun. 20, 2000

[54] FREQUENCY-DOMAIN ADAPTIVE CONTROLLER

[75] Inventors: Qing Guo Wang; Chang Chieh Hang, both of Singapore, Singapore

[73] Assignee: National University of Singapore, Singapore

[21] Appl. No.: 09/182,242

[22] Filed: Oct. 30, 1998

Related U.S. Application Data

[63] Continuation of application No. 08/732,680, Oct. 16, 1996.

[51] Int. Cl.[7] .................................................. G05B 13/02
[52] U.S. Cl. ........................................... 364/158; 364/157
[58] Field of Search .............................. 364/148.01, 151, 364/157, 158, 159, 162, 164, 166, 172, 191, 194

[56] References Cited

U.S. PATENT DOCUMENTS 4,616,308  10/1986  Morshedi et al. ...................... 364/159
5,587,899  12/1996  Ho et al. .................................. 364/157

*Primary Examiner*—James P. Trammell
*Assistant Examiner*—Demetra R. Smith
*Attorney, Agent, or Firm*—Lowe Hauptman Gopstein Gilman & Berner

[57] ABSTRACT

A frequency domain auto-tuning and continually adapting control regulating apparatus is applied to a linear stable process. A FFT based identification is applied to non-transformable samples of transient signals to obtain simultaneous and accurate multiple-point estimates of a frequency domain approximation of the process transfer function as an estimate of a frequency response. A linear least squares multiple-point-fitting process provides regulator design parameters. A multiple-point-fitting transfer function modeling process is disclosed, and an adaptive regulator design process is applied to compensate for changes in the process set-point or for load disturbances. In addition, techniques are provided for auto-tuning of multivariable regulators.

19 Claims, 3 Drawing Sheets

FREQUENCY-DOMAIN ADAPTIVE CONTROLLER

This application is a continuation of application Ser. No. 08/732,680 filed Oct. 16, 1996.

FIELD OF THE INVENTION

The present invention generally relates to the field of control systems, and more particularly to process control devices, and still more particularly to the provision of frequency domain techniques thereto in order to provide an auto-tuning and continually adaptive implementation of regulator design for control of linear and stable processes by considering a plurality of frequency response points of the process. The invention further and still more particularly relates to implementation of design of multivariable regulator devices for multivariable processes, using linear equations.

BACKGROUND OF THE INVENTION

Known techniques of automatic tuning for adaptive control use a concept known as relay feedback automatic tuning, which has been commercialized for approximately 10 years and which remains attractive owing to its simplicity and robustness. One known and widely accepted approach to regulator automatic tuning uses a process dynamics estimation scheme and a regulator design procedure. In standard relay feedback automatic tuning, as described in U.S. Pat. No. 4,549,123 to Hagglund et al. entitled "Method and an Apparatus in Tuning a PID Regulator" for example, only a single process point, specifically the critical point of the process, is estimated and the parameters of a PID (proportional-integral-derivative) controller are set with respect to this single point. While this method has become standardized and is successful in many process control applications, it suffers from two main problems.

(I) Due to the adoption of the describing function approximation, the estimation of the critical point is not accurate. Under some circumstances (such as oscillatory or significant long dead-time processes, for example) the known method could result in a significant error. For these cases, the tuned regulators which result therefrom may thus yield a poor system performance. Further, as above noted, the standard relay feedback technique estimates only one point on the process frequency response. Such an approach may be insufficient for describing some processes, or for designing model based regulators.

Thus, some modifications to the standard estimation method have been reported. For example, cascading a known linear dynamics to the relay in the standard method can acquire a point other than the critical point. However, the existing relay feedback frequency response estimation methods still suffer from low accuracy, long test time (e.g. when multiple frequency response points are needed) and low efficiency (limited process frequency response information is obtained from one test).

(II) As insufficient and inaccurate frequency response information is utilized in tuning the regulator, the achievable system performance is thus limited. This is particularly true when a process has oscillatory dynamics, or a model-based controller such as the Smith Predictor is considered.

DISCLOSURE OF THE INVENTION

It is accordingly an object of the invention to provide a new and improved method for designing controller apparatus and for regulator control which overcomes the deficiencies of the prior art.

It is a more specific object of the invention to provide method and apparatus for auto-tuning, as well as for continual self-tuning, of a dynamics identification and control design, thus to enable accurate control of processes with frequent dynamics changes.

It is yet another object of the invention to enable continual self-tuning for controller design to be implemented by using any significant transient, whether resulting from changes in set-point or from load disturbances.

Still a more specific object of the invention is to provide a frequency domain based auto-tuning and continually adapting control apparatus.

In order to provide such an apparatus, it is a further object of the invention to overcome the deficiencies of the prior art by providing an improved means for accurately identifying multiple points of a process frequency response with only a single relay or step test, and to tune a regulator with respect to the identified multiple points of the process frequency response, thereby to achieve a uniform and improved performance for all operating conditions of the process, thus to provide an improvement which is applicable to both simple and complex single variable processes.

A more specific object of the invention is to provide a frequency domain auto-tuning and adaptive control apparatus which automatically and continually estimates the process frequency response and which adaptively controls the process when the control apparatus is connected to a process.

Yet another object of the invention is to apply a relay feedback or step test to a process and to identify any finite number of points on the process frequency response from a single process transient by providing an appropriate application of the Fast Fourier Transform (FFT), thus to provide an exact result for linear stable processes without load disturbances.

It is a further object of the invention to modify signals which are not capable of FFT transformation in order to provide modified signals for such FFT transformation and to identify regulator parameters from characteristics of the modified signals, thereby to design a regulator for attaining a desired transfer function of the process.

It is still another object of the invention to utilize both set-point and load disturbance transients in order to continually adapt the regulator to change in the process dynamics and, moreover, to provide techniques for auto-tuning of multivariable regulators.

SUMMARY OF THE INVENTION

In accordance with the foregoing and other objects, the present invention provides an auto-tuning and adaptive control apparatus, operating in the frequency-domain, which automatically and continually estimates a process frequency response and which adaptively controls the process when the apparatus is connected to a process.

In accordance with the invention, a relay feedback or step test is applied to the process. By providing an appropriate application of the Fast Fourier Transform (FFT), the invention is thus capable of identifying any finite number of the process frequency response points with a single process transient, and of providing an exact result for linear stable processes without load disturbances.

In accordance with another feature of the invention, linear least squares frequency response fitting is used to design the regulator, which may be a PID or a higher-order regulator, as required.

In accordance with yet another feature of the invention, both set-point and load disturbance transients are utilized in order to continually adapt the regulator to changes in the process dynamics. In addition, the invention further provides techniques for auto-tuning of multivariable regulators.

Thus, in accordance with the invention, there is provided a method and apparatus for continuously adapting and auto-tuning a regulator for a process-implementing device, in which the inventive method includes steps of, and the inventive apparatus operates by, using a single step or relay test to observe input and output transients of the process-implementing device; estimating a plurality of points on a frequency response of the device from the transients by using an FFT-based identification; using an optimal multiple-point fitting method for automatically selecting parameters of a regulator structure based on the estimated frequency-response points; constructing a transfer function based on the estimated frequency-response points; based on the constructed transfer function, constructing a Smith Predictor using the optimal multiple-point fitting method; and adaptively designing the regulator in response to changes in set-point or load disturbance by repeating the step of estimating the plurality of points on the frequency response of the process-implementing device in response to changes in set-point or load disturbance in order to provide an updated frequency response.

In accordance with another facet of the invention, sequential relay tests or step inputs are used to estimate a plurality of points of a frequency-domain transfer function of a device implementing a multivariable process, from transients on the inputs and outputs of the device which result from the sequential relay tests or step inputs; the optimal multiple-point-fitting method is used to determine parameters of multivariable regulators from the plurality of estimated frequency-domain points; and the estimated frequency-domain points are used for modeling a transfer function of the multivariable process; based on the modeled transfer function of the multivariable process, a Smith Predictor is constructed using the optimal multiple-point fitting method and a primary tuning of the multivariable regulators is provided.

In according with a specific feature of the invention, identification of the plurality of points on a frequency response from the transients resulting from a single step or relay test is attained by introduction of a decay exponential into the transient signals representing the process input and output, thus to enable processing the modified transients with the FFT to obtain a shifted process frequency response and further to convert the shifted process frequency response into an unshifted process frequency response using IFFT and FFT techniques.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF DRAWINGS

The accompanying drawings, which are incorporated into and constitute a part of the description of the invention, illustrate the preferred embodiments of the invention and, together with the specification, serve to explain the principles of the invention. It is to be understood, however, that the drawings are designed for purposes of illustration only, and do not define or limit the invention. The limits of the invention will be appreciated upon reference to the claims appearing at the end of the description. In the drawings:

DETAILED DESCRIPTION OF A PREFERRED EMBODIMENT OF THE INVENTION

In accordance with the objects and features of the invention, there is provided a method and apparatus for auto-tuning and continuously adapting a control apparatus in the frequency domain. The new apparatus incorporating the novel function will be described with reference to the accompanying drawings.

Figure 1:
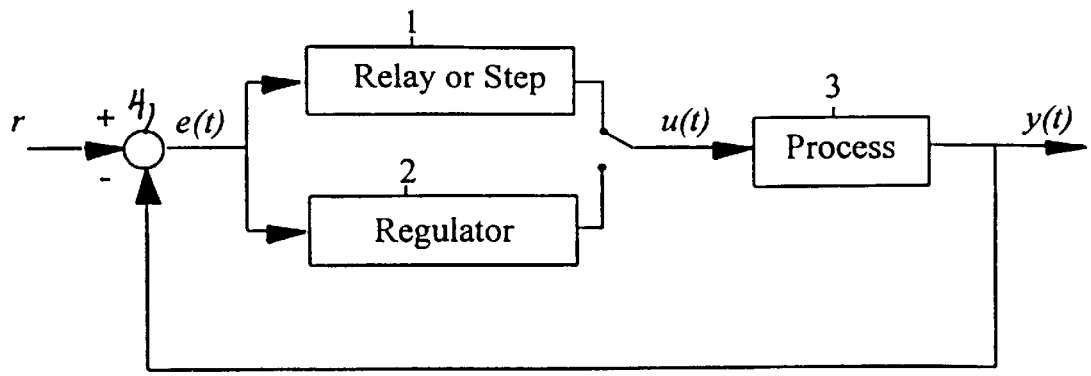
FIG. 1 is a block diagram showing an auto-tuning configuration for a control system.

Therein, FIG. 1 is a diagram of an auto-tuning apparatus for controlling a process-implementing apparatus 3 (hereinafter "process")—i.e., a device which is implementing a linear and stable process. It should be appreciated that the process 3 represents any physical device which is operating in accordance with some operational parameters to perform some operation on a control input u(t), which may represent an electrical input signal (or other input) to provide an output y(t), which may represent an electrical output signal (or other output) for example. Such a device is typically represented by a process transfer fluction $G_p$. As is known in the art, the process transfer function $G_p$ may be represented in the frequency domain as a function $G_p(s)$. Typically, the input u(t) to the process 3 may be an input control signal which causes the device characterized by the transfer function $G_p$ (process 3) to provide an output y(t), the input control signal being provided to process 3 in response to an external input r provided to a summing amplifier 4. In the configuration illustrated in FIG. 1, the summing amplifier 4 compares the output y(t) with the external input r by subtracting the output y(t) from the input r, for example, in order to generate an error signal e(t) which is inputted to a regulator 2. Regulator 2 is designed with a particular transfer function to produce a specific output function u(t) in response to a specific input function e(t). The transfer function of the regulator is provided so that the specific output u(t) thereof is that input which causes process 3 to provide the particular output y(t) desired by a user when inputting the signal r.

Figure 2:
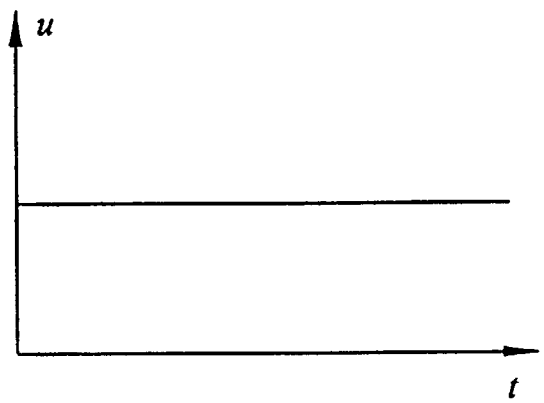
FIG. 2 is a diagram of a step function.
Figure 3:
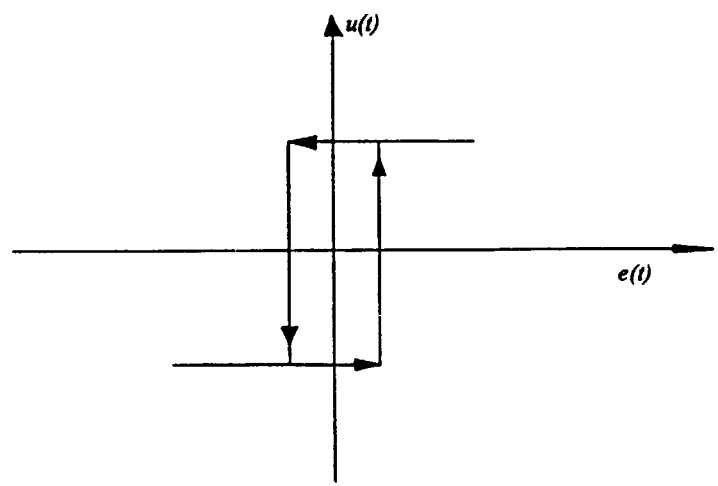
FIG. 3 is a diagram showing an input-output relation of a relay with hysteresis.

In order to appreciate operation of the configuration illustrated in FIG. 1, let it be assumed that process 3 operates in an open loop fashion and is manually controlled to reach a steady state, without auto-tuning. Then, in an initialization phase of the auto-tuning process, an input device 1 may provide a step input function, shown in FIG. 2, or may operate as a relay feedback shown in FIG. 3, to provide its output to process 3. As will be appreciated from the detailed description provided herein, this initialization phase is used in a process for auto-tuning regulator 2. It should be understood that, although a step function generator and a relay feedback are described, the number of devices which may provide a perturbation to the input of process 3 is virtually unlimited. Any perturbation may be relied upon to implement the invention, although the step function and relay feedback concepts are simple to illustrate and simple to follow, and are used herein for illustrative purposes.

The input change (whether that of FIG. 2 or of FIG. 3) provided to the process 3 results in a presence of input and output time responses u(t) and y(t) at the input and output of the device implementing the process 3. The signals u(t) and y(t) are sampled by standard devices (not shown) at a sampling period of T and are recorded until the transients are complete—i.e., until either the steady state is reached for the step input or stationary limit cycles have been reached for the relay test. In the following description, the samples of the input u(t) and output y(t) at the k-th sampling period are represented by u(kT) and y(kT).

Although a theoretical explanation of operation of the invention is not necessary, the following description provides an illustration of the manner in which the frequency response of process 3 is estimated in accordance with the invention. Upon understanding the theoretical underpinnings of the invention, those of ordinary skill in the art will be enabled to practice the invention.

The inventors hereof have appreciated that a fast-Fourier-transform ("FFT") cannot be applied to the input and output time response samples u(kT) and y(kT) of process 3 under the above described test conditions (either step or relay). Nonetheless, such a (FFT) transform is necessary in order to obtain the process transfer function. Thus, in order to obtain the desired FFT-transformation, in accordance with the invention a decay exponential $e^{-\alpha kT}$ is introduced in order to define a pair of modified signals $\tilde{u}(kT)$ and $\tilde{y}(kT)$ as follows:

$$\tilde{u}(kT) = u(kT)e^{-\alpha kT}, \tilde{y}(kT) = y(kT)e^{-\alpha kT}. \quad (1)$$

It will be appreciated that, by introducing the decay exponential, the modified signals $\tilde{u}(kT)$ and $\tilde{y}(kT)$ decay to zero exponentially as k approaches infinity. Thus, by introducing the decay exponential the exponentially decaying modified signals $\tilde{u}(kT)$ and $\tilde{y}(kT)$ are provided as Fourier transformable representations of the input u(t) and output y(t). Applying the FFT to the modified signals described in Eq. (b 1) yields $$\tilde{U}(j\omega_i) = FFT(\tilde{u}(kT)) = T\sum_{k=0}^{N-1} \tilde{u}(kT)e^{-j\omega_i kT}, \quad i = 1, 2, \ldots, m, \quad (2)$$

and $$\tilde{Y}(j\omega_i) = FFT(\tilde{y}(kT)) = T\sum_{k=0}^{N-1} \tilde{y}(kT)e^{-j\omega_i kT}, \quad i = 1, 2, \ldots, m, \quad (3)$$

respectively, where N is the number of samples, m=N/2 and $\omega_i = 2\pi i/(NT)$. The transformed signals are used to obtain the frequency domain transfer function $G_p$ as follows.

A shifted frequency domain transfer function of process 3 is given by the frequency response ratio in Eq. (b 4)

$$G_p(j\omega_i + \alpha) = \frac{Y(j\omega_i + \alpha)}{U(j\omega_i + \alpha)} = \frac{\tilde{Y}(j\omega_i)}{\tilde{U}(j\omega_i)}, \quad i = 1, 2, \ldots, m. \quad (4)$$

In accordance with the present invention, this shifted frequency response is used to tune regulator 2. The number of samples N and the test time $T_e$ used in the tuning process for the regulator are determined as follows.

It is first considered that some number (M) of points of the frequency response of process 3 is required to be identified in the region from zero frequency to the phase-crossover frequency $\omega_c$. If, under a relay test, the oscillation period $T_0$ of the process output y(t) is measured on line, then it should be appreciated that the required time span for the FFT-based identification is $T_f = (N-1)T$, where N satisfies $$N > (M-1)\frac{T_0}{T}. \quad (5)$$

Most FFT algorithms or programs which would be used to implement the FFT algorithm on the modified signals $\tilde{u}(kT)$ and $\tilde{y}(kT)$ use the high speed radix-b 2FFT method. In order to save calculation time for the FFT, it is preferable to choose N to be an integer power of 2. To reduce the window leakage problem associated with the FFT, a larger number N will give a more accurate result. If a stationary limit cycle of the process output y has been achieved before the test time reaches $T_f$, then the test is stopped and, in accordance with the invention, p cycles of the process 3 input u and output y oscillation data are duplicated until the time span of the process 3 input u and output data y reach $T_f$, i.e., $$T_e + pT_0 \geq T_f \quad (6)$$

Otherwise, if the testing time $T_e$ is larger than the required $T_f$, then the testing time $T_e$ may be used in place of $T_f$. The value of the decay coefficient $\alpha$ is chosen to meet the requirement that the modified signals $\tilde{u}(kT)$ and $\tilde{y}(kT)$ decay approximately to zero as time approaches $T_f$. That is, $\alpha$ is chosen to meet the requirement that $$\alpha \geq -\frac{\ln \varepsilon}{T_f}, \quad (7)$$

where $\varepsilon$ is the specified threshold and usually takes a value in the range of $10^{-5} \sim 10^{-10}$.

The above described FFT-based multiple-point frequency response estimation method is referenced herein as an Identification Solution.

It should be appreciated that a novel and key point of the above described FFT-based multiple-point process frequency response estimation method resides in the introduction of a decay exponential $e^{-\alpha kT}$ to the sampled input signals $\tilde{u}(kT)$ and $\tilde{y}(kT)$. It should also be understood that it is within the scope of the invention to introduce a similar decay exponential to the input signal u(t) and output signal y(t). In either case, however, it is the introduction of this decay exponential $e^{-\alpha kT}$ which makes it possible to obtain a FFT of the modified signals $\tilde{u}$ and $\tilde{y}$. With the introduction of the decay exponential, the multiple points on the process frequency response can thus be obtained in a single test.

It is recognized that, as a balance of multiple accurate frequency response points being obtained from a single test, the calculation is a bit complex. However, the computation elapsed time is tolerable in real time process control.

Nonetheless, computations can be reduced if, rather than requiring points representing all frequencies up to the Nyquist frequency, fewer points are required and used.

Moreover, the FFT moving version can be exploited to track process frequency response; however, the recursive version of FFT can be implemented to simplify the computations.

It should be appreciated that the shifted process frequency response points $G_p(j\omega_i+\alpha)$ are sufficient for tuning the regulator in the following examples, as illustrated by the sequence of steps beginning at Equation (11). However, if $G_p(j\omega_i)$ is needed, such as in the case of designing a Smith Predictor, then the inverse FFT of $G_p(j\omega_i+\alpha)$ may be taken:

$$FFT^{-1}(G_p(j\omega_i+\alpha))=g(kT)e^{-\alpha kT}, \quad (8)$$

from which the process impulse response g(kT) is obtained as $$g(kT)=FFT^{-1}(G_p(j\omega_i+\alpha))e^{\alpha kT}. \quad (9)$$

Applying FFT to g(kT) again yields the process frequency response:

$$G_p(j\omega_i)=FFT(g(kT)). \quad (10)$$

The estimated multiple points of frequency response $G_p(j\omega_i+\alpha)$ in Eq. (4) are used as follows for tuning (e.g., designing) regulator 2 in FIG. 1. The control specifications are formulated in Eq. (11) as a desirable objective closed-loop transfer function $H_d(s)$ from r to y:

$$H_d(s) = \frac{\omega_n^2}{s^2 + 2\zeta\omega_n s + \omega_n^2} e^{-L_p s}, \quad (11)$$

where $L_p$ is the apparent dead-time of the process 3, and $\omega_n$ and $\zeta$ dominate the behavior of the desired closed-loop response. If the control performance is specified by the user as the settling time $t_s$ and overshoot $\delta$, then $\zeta$ and $\omega_n$ may be chosen to satisfy the following criteria:

$$\delta = e^{-\mu\zeta\pi/\sqrt{1-(\mu\zeta)^2}} \times 100\% \quad (12)$$

and $$\omega_n = \mu \frac{4}{\zeta(t_s - L_p)}, \quad (13)$$

where $\mu$ is a factor for modification of $\zeta$ and $\omega_n$, and depends on the different fitting situations. The modification factor $\mu$ is typically in the range of 0.5~2 and the default value $\mu$ is 1.

If the control specifications are given by the user as the phase margin $\phi_m$ and gain margin $A_m$, then $\omega_n$ and $\zeta$ are determined by $$\zeta = \mu\sqrt{\frac{1-\cos^2\varphi_m}{4\cos\varphi_m}} \quad (14)$$

and $$\omega_n = \frac{\mu \cdot \tan^{-1}\left(\frac{2\zeta q}{q^2-1}\right)}{qL}, \quad (15)$$

where q is the positive root of equation $$(A_m-1)^2=4\zeta^2 q^2+(1-q^2)^2 \quad (16)$$

If the control specifications are not given by the user, then default settings are used for the parameters $\zeta$ and $\omega_n L_p$, preferably values such as $\zeta=0.707$ and $\omega_n L_p=2$. Using these values implies that the overshoot of the objective system response is about 5%, the phase margin is 60° and the gain margin is 2.2.

As will be appreciated by those of ordinary skill, for the configuration illustrated in FIG. 1 the open-loop transfer function $G_d$ corresponding to the desired closed loop transfer function $H_d$ is given by $$G_d(s) = \frac{H_d}{1 - H_d}. \quad (17)$$

Of course, the open loop function described in Eq. (17) is applicable for the configuration shown in FIG. 1. However, it should be appreciated that various control devices may be placed in the feedback loop of the system, thus altering the relationship between $H_d$ and $G_d$ from that described by Eq. (17) in a manner well known in the art.

REGULATOR DESIGN

The regulator 2 in FIG. 1 has (and is described by) a transfer function $G_c$. In accordance with the invention, the transfer function $G_c$ of regulator 2 is designed such that the product $G_p G_c$, representing the transfer function of the cascaded combination of the regulator and the process, is fitted to the desired transfer function $G_d$ in the frequency domain. To this end, in accordance with the invention a number of process frequencies, $\omega_i$, i=1, 2, . . . , are chosen such that $$\arg(G_p(j\omega_i+\alpha))<-\pi, i=1,2,\ldots,m-1,$$

and $$\arg(G_p(j\omega_m+\alpha))\approx-\pi \quad (18)$$

At the corresponding values of the frequency parameter s, i.e., at $s=j\omega_i+\alpha$, the design of $G_c$ is implemented to achieve the relation $$G_p(j\omega_i+\alpha)G_c(j\omega_i+\alpha)=G_d(j\omega_i+\alpha), i=1,2,\ldots,m. \quad (19)$$

As a first approximation of the type of regulator which may be used to implement the desired transfer function for the combined system, a PID regulator is used as a candidate for $G_c$. As is known in the art, such a PID regulator is described by a transfer function $$G_c(s) = K_c\left(1 + \frac{1}{T_i s} + T_d s\right) = \begin{bmatrix} 1 & \frac{1}{s} & s \end{bmatrix}\begin{bmatrix} K_c \\ \frac{K_c}{T_i} \\ K_c T_d \end{bmatrix}. \quad (20)$$

Equation (20) can be rearranged into real linear equations shown in (21)

$$A\vec{x} = \vec{b} \quad (21)$$

where the matrix A contains frequency response data from the process controller $\overline{G}_p = G_p[1 \ 1/j\omega_i+\alpha \ j\omega_i+\alpha]$, the vector $\vec{b}$ represents data from the desired transfer function $G_d(j\omega_i+\alpha)$, and $\vec{x} = [K_c \ K_c/T_i \ K_c T_d]^T$. The resulting set of equations described by Eq. (21) are easily solved using the least squares method to obtain the parameters of the PID regulator which, in conjunction with the process 3, provides the desired transfer function for the system. Having obtained the parameters, the actual PID device is thus easily produced, whether by programming a processor to implement the same or by use of known PID controllers having adjustable control parameters.

In accordance with the invention, however, the inventive design may be implemented in a repetitive process to attain a desired accuracy by comparing the results with an arbitrary criterion of acceptability. For example, prior to terminating the design process and accepting the design parameters obtained by solving the linear equations (21), the solution may be evaluated using the following criterion:

$$\max_i |G_p(j\omega_i)G_c(j\omega_i) - G_d(j\omega_i)| \leq E \quad (22)$$

where E is a specified fitting error threshold. Obviously, the desired stability margins impose an upper bound for E. Within this bound, E is specified according to the desired degree of performance. In Eq. (22), the smaller is the value of E the tighter is the resulting control.

Upon determining that Eq. (22) is satisfied, the design is accepted and the regulator implemented as a PID having the parameters obtained from solving Eq. (21).

However, if the criterion described at Eq. (22) is not satisfied, it is concluded that a PID form for regulator 2 is insufficient for implementing the process to obtain the desired performance. In this case, a more complicated structure of the regulator 2 is considered to obtain a better fit to the error threshold. While many alternatives may be used to implement a more complex regulator, one approach may be to select the following function for the regulator 2, and to solve for the parameters $a_i$ and $b_i$ therein:

$$G_c(s) = \frac{a_4 s^4 + a_3 s^3 + a_2 s^2 + a_1 s + 1}{b_3 s^3 + b_2 s^2 + b_1 s}. \quad (23)$$

Upon identification of the parameter values, an appropriate regulator may be obtained in a straightforward manner to implement the transfer function of Eq. (23), and thus to provide a closer approximation (within a reduced error threshold) of the desired transfer function $G_d$ when cascaded with the process 3.

The fitting equation (19) may thus be rewritten as $$[G_p s^{-1}\ G_p s^3\ G_p s^2\ G_p s - G_d s^3 - G_d s^2 - G_d s] \vec{X} = [-G_p], \quad (24)$$

where $\vec{X} = [a_{-1}\ a_3\ a_2\ a_1\ b_3\ b_2\ b_1]^T$. At values of the frequency variable $s = j\omega_i + \alpha$, Equation (24) becomes a system of linear equations, from which $\vec{X}$ can be determined by the least squares method in the same manner used to obtain the parameters for the first order approximation, wherein a PID implementation was selected as hereinabove described. Upon determining that Eq. (22) is satisfied with the solution obtained for Eq. (24), the design is accepted and the regulator implemented as a device having the parameters obtained from solving Eq. (24). However, if the criterion described at Eq. (22) is still not satisfied, it may be concluded that a form for regulator 2 described by the transfer function of Eq. (23) is also insufficient for implementing the process to obtain the desired performance. Thus, a still more complicated structure of regulator 2 may be considered to obtain a still better fit to the error threshold described by Eq. (22).

Alternatively, however, it may be concluded that the objective closed-loop performance required by Eq. (11) may have been set to an unrealizable level. In this situation, a more reasonable objective closed-loop dynamics may be established, such as by decreasing $\zeta$ or reducing $\omega_n L$, until it is determined that the error criterion described in Eq. (22) is satisfied, whether for a PID described by Eq. (20), a more complex structure described by Eq. (23), or still other and more complex configurations known in the art. After regulator 2 in FIG. 1 has been designed as above, relay (or step generator) 1 is disconnected from the control system, and regulator 2 is connected to the process 3. Process 3 is now under control.

The above described regulator design method of the invention is identified herein as a multiple-point-fitting solution.

Various advantages of the inventive approach may be appreciated from comparison with results obtained by using known methods.

For example, in methods based on Ziegler-Nichols-like and gain/phase margin specifications, only one or two frequency response points are moved to the desired places. The inventive method, on the other hand, advantageously can shape the loop frequency response to optimally match an entire desired curve, specified by $G_d(j\omega_i)$, over a large range of frequencies, so that the closed-loop performance is more closely guaranteed to match the curve than is possible with methods using only one or two points. Moreover, the approach of the present invention using a response fitting is a more reasonable requirement than obtaining an exact point, as exact point matching is sometimes impossible or, indeed, is not necessarily important. What is actually required is that the designed loop be close enough to the desired loop. Yet, the method of the invention is simpler in the sense that the problem becomes linear, while other approaches are generally nonlinear. In fact, true gain and phase margin methods require that:

(1). the process frequency response be converted into a transfer function model. The model structure must be specified but for ease of computation the specified structure is usually very simple, such as first-order plus dead time, and it may not describe the process sufficiently; and that (2). both the regulator and the model be brought back to the frequency domain to solve gain and phase margin equations which are nonlinear and transcendental.

These difficulties are completely avoided by the inventive approach. With the objective response, the invention permits the solution to be implemented totally in the frequency domain, enabling better and more accurate formulation of control performance specifications. Full and direct use of the frequency domain has been made possible herein by developing both process identification and regulator design in the frequency domain.

Stability. The closed-loop stability and stability margin for a system designed in accordance with the above described process can easily be analyzed from the Nyquist curve of the designed $G_p G_c$. The curve is enclosed by bonds with the objective $G_d$ as the center and E as the radius.

Performance. The present design gives better PID settings than usual formulas and naturally leads to a high-order regulator whenever it is necessary for complex processes for which simple PID is not adequate.

Weighting. Weights may be introduced to emphasize matching over some frequencies other than others. The modification to accommodate weights is straightforward.

For example, Let a weight be $\omega_i$ for frequency $\omega_i$. It is only necessary to replace $G_p(j\omega_i+\alpha)$ and $G_d(j\omega_i+\alpha)$ with $w_i G_p(j\omega_i+\alpha)$ and $w_i G_d(j\omega_i+\alpha)$, respectively, and use the procedure as above described.

Modification. The above procedure for the regulator design may be modified for a series of PI/lead/lag compensators to reduce the dimension of least squares from 3 to 2. To this end, PI is first used for obtaining an overall fitting. Then, respective frequency ranges are determined for which $G_d$ leads or lags the compensated process. A lead or lag compensator is accordingly adopted. More weights are put on that particular range than on others and the resultant fitting problem is solved to find the two parameters concerned. The procedures are repeated once for each range, until the compensations on all the ranges are completed. As each subproblem is now of dimension 2 and no inversion of matrix is required, the approach is considerably simplified.

APPLICATION FOR ADAPTATION FROM SET-POINT CHANGE

Figure 4:
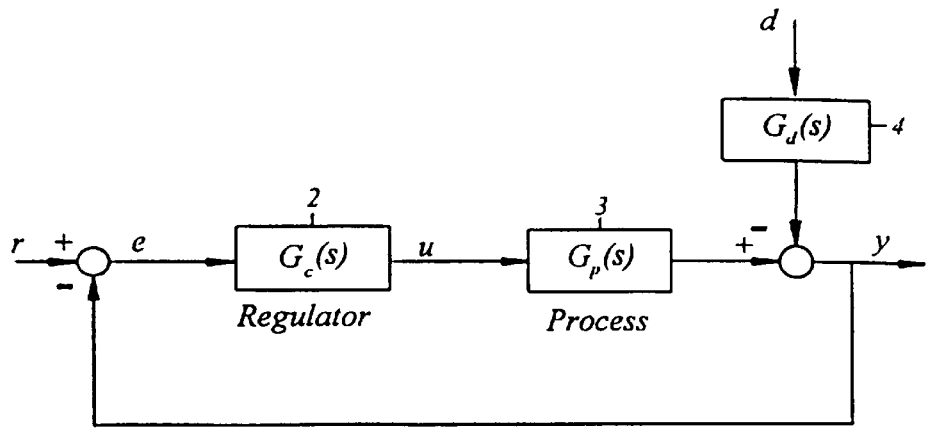
FIG. 4 is a block diagram showing continual self-tuning of a regulator under changes of a set-point r and subject to load disturbances d.

After implementation of the regulator in accordance with the foregoing description, the control system runs in closed-loop, as illustrated in FIG. 4. Continuous adaptation of the regulator to the changing dynamics of the process is provided by responding to detection of a significant transient in the system. Specifically, the regulator is unchanged from the design hereinabove implemented, until a significant is detected in the system. If the transient is caused by a step set-point change, then the resultant output y and input u time responses are recorded. Just as in the auto-tuning case hereinabove described, these time responses are used to estimate a possible newly changed process frequency response. Based on the sampled transient signals, the regulator $G_c$ may be redesigned, or re-tuned, as above described. Thus, the regulator is adapted to the changed process dynamics. Such adaptation may be automatically implemented upon detection of transients in excess of a predetermined magnitude, thus providing a continuously adaptable regulator for the process.

ADAPTATION FROM LOAD DISTURBANCE

If no set-point change has been made, any significant transient must be the result of some load disturbances. All such disturbances can be collected and grouped as an equivalent disturbance d acting at the process output y through an unknown dynamic element $G_d$, as shown in FIG. 4. An analysis of the inventive approach to such adaptation permits an assumption that a transient in the loop is caused by an external load disturbance d. The resultant responses y(t) and u(t) are recorded from the time when the output signal y(t) starts to change, to the time when the system settles down. It is thus desired to re-identify the process $G_p$ from the recorded responses, so that the regulator $G_c$ can be re-tuned and adapted to any change in $G_p$.

The modified process illustrated in FIG. 4 is now described as $$Y(s)=G_p(s)U(s)+G_d D(s) \tag{25}$$

If d is measurable, the FFT technique is applied to d to compute the FFT thereof, $D(j\omega_i)$. If d is unmeasurable then, upon waiting for the process input to reach a steady state, it may then be inferred that $$D(s) = \begin{cases} 1 & \text{if } u(\infty) = u(0); \\ \dfrac{1}{s} & \text{if } u(\infty) \neq u(0). \end{cases} \tag{26}$$

$G_p$ and $G_d$ are respectively modeled as $$G_p(s) = \frac{\beta s + 1}{\alpha_1 s^2 + \alpha_2 s + \alpha_3} e^{-L_p s} \tag{27}$$

and $$G_d(s) = \frac{\gamma s + 1}{\lambda_1 s^2 + \lambda_2 s + \lambda_3}. \tag{28}$$

Equation (25) can then be rearranged into $$a_1 s^4 Y(s) + a_2 s^3 Y(s) + \ldots + a_5 Y(s) = b_1 s^3 U(s) e^{-L_p s} + \ldots + b_3 s U(s) e^{-L_p s} + b_4 U(s)$$

$$e^{-L_p s} + c_1 s^3 D(s) + \ldots + c_3 s D(s) + D(s), \tag{29}$$

Equation (29) is re-written as $$\Phi X = D(s), \tag{30}$$

where $\Phi = [s^4 Y(s)\ s^3 Y(s) \ldots Y(s)\ -s^3 U(s) e^{-L_p s} \ldots -U(s) e^{-L_p s}\ -s^3 D(s) \ldots -sD(s)]$, and $X = [a_1, a_2 \ldots a_5, b_1, b_2, \ldots, b_4, c_1, \ldots c_3]^T$ is the vector of real parameters to be estimated. If the process dead-time $L_p$ is known, then with frequency responses $Y(j\omega_i)$, $U(j\omega_i)$ and $D(j\omega_i)$, $i=1,2,\ldots,m$, computed via the FFT, (30) yields a system of linear algebraic equations. The least square solution X is then obtained in (30). This solution in fact depends on $L_p$ if $L_p$ is unknown. The fitting error for (30) is given by $$J(L) = \|\Phi(\Phi^T \Phi)^{-1} \Phi^T D - D\|_2 \tag{31}$$

which is a scalar nonlinear algebraic equation in only one unknown $L_p$. The error is then minimized with respect to $L_p$ in the given interval, which is an iterative problem on one parameter $L_p$. Each iteration needs to solve a Least Squares problem corresponding to a particular value of $L_p$. The model parameters are obtained when the minimum value of J is achieved. To facilitate solution further, bounds are derived for $L_p$ so that the search can be constrained to a small interval. This will greatly reduce computations, improve numerical property, and produce a unique solution. It is noted that the phase lag contributed by the rational part of the model, $$G_{p0}(s) = \frac{\beta s + 1}{\alpha_1 s^2 + \alpha_2 s + \alpha_3},$$

is bounded, i.e., $$\arg G_{p0}(j\omega) \in \left[-\pi, \frac{\pi}{2}\right], \forall\, \omega \in (0, \infty), \tag{32}$$

so that an upper bound $\overline{L}_p$ and a lower bound $\underline{L}_p$ can be imposed on $L_p$:

$$\overline{L}_p = \min\left\{-\frac{\arg G_p(j\omega_k) - \frac{\pi}{2}}{\omega_k}\right\},\ k = 1, 2, \ldots, m \tag{33}$$

and $$\underline{L}_p = \max\left\{-\frac{\arg G_p(j\omega_k) + \pi}{\omega_k}\right\},\ k = 1, 2, \ldots, m. \tag{34}$$

It is further to be understood that the invention makes it possible directly to provide a gross estimate for dead time from a change in relay feedback or set-point by measuring the time $\hat{L}_p$ between a change in control signal to the initial reaction of the output. Another possible bound may then be:

$$L_p \in [0.5\hat{L}_p \ 1.5\hat{L}_p]. \quad (35)$$

Extensive simulation and real-time experiments show that within a reasonable bound, the error constraint identified in Eq. (31) exhibits a concave relationship with respect to $L_p$ and yields a unique solution. Once $L_p$ is determined, X is determined with the aid of the computation provided from Eq. (30).

In that regard, if the process dead time $L_p$ is unchanged since the last identification of the frequency response of process $G_p$, no iteration is needed to solve Eq. (30). This is a special case in that the bound for $L_p$ is specified as a zero interval, which greatly simplifies the identification. However, such a situation may well be true in many practical cases, as process dynamics perturbations are usually associated with operating point changes and/or load disturbance, which mainly cause time constant/gain changes. Thus, in many typical situations, the inventive concepts may be carried out under simplified conditions. Moreover, any small change in dead time can be discounted in other parameter changes thus further simplifying application of the invention to practical systems.

TRANSFER FUNCTION MODELING

Application of the inventive concepts to modeling of the frequency-domain transfer functions of a process is described as follows. The estimated multiple points of process frequency response are sufficient for implementation of both auto-tuning and adaptive tuning of the regulator 2 (as described above with respect to FIG. 1 and FIG. 4). However, for a model based regulator, such as the Smith Predictor, the multiple points obtained above are not enough. As is known in the art, a transfer fluction model of the process 3 is required for implementation of the Smith system. In accordance with the present invention, there is provided a simple solution for transfer function modeling, without iterations. Such a solution is obtained in accordance with the following disclosure. Where the process $G_p$ is described by the model described by Eq. (27), the model should be fitted to the identified process frequency response as well as possible. At frequencies $s=j\omega_i$, Eq. (27) yields $$\frac{j\omega_i \beta + 1}{-\omega_i^2 \alpha_1 + j\omega_i \alpha_2 + \alpha_3} e^{-j\omega_i L_p} = G_p(j\omega_i), \quad i = 1, 2, \ldots, m. \quad (36)$$

In accordance with the invention, further considerations are premised on taking the magnitudes of both sides of Eq. (36) in order to avoid any iterative calculation, i.e.

$$\left[ \omega_i^4 \ \omega_i^2 \ 1 \ -\frac{\omega_i^2}{|G_p(j\omega_i)|^2} \right] X = \frac{1}{|G_p(j\omega_i)|^2}, \quad i = 1, 2, \ldots, m, \quad (37)$$

where $X=[x_1 \ x_2 \ x_3 \ x_4]^T=[\alpha_1^2 \ \alpha_2^2 \ -2\alpha_3\alpha_1\alpha_3^2 \ \beta^2]^T$. Equation (37) is a system of linear equations in X and can be solved for X with the linear least squares method. For a stable system, $\alpha_1, \alpha_2, \alpha_3$ and $\beta$ can be recovered from X as $$\begin{bmatrix} \alpha_1 \\ \alpha_2 \\ \alpha_3 \\ \beta \end{bmatrix} = \begin{bmatrix} \sqrt{x_1} \\ \sqrt{x_2 + 2\alpha_1\alpha_3} \\ \sqrt{x_3} \\ \sqrt{x_4} \end{bmatrix}. \quad (38)$$

The phase relation included in Eq. (36) yields $$\omega_i L_p = -\arg[G(j\omega_i)] + \tan^{-1}\beta\omega_i - \tan^{-1}\alpha_2 \frac{\omega_i}{\alpha_3 - \alpha_i\omega_i^2}, \quad (39)$$

$$i = 1, 2, \ldots, m.$$

Based on the foregoing inventive considerations, it should thus be clear that $L_p$ can again be estimated by applying the least squares method to Eq. (39), thus obtaining a model in the form of Eq. (27) that best matches the process frequency response.

APPLICATION TO A DEAD TIME COMPENSATOR

Figure 5:
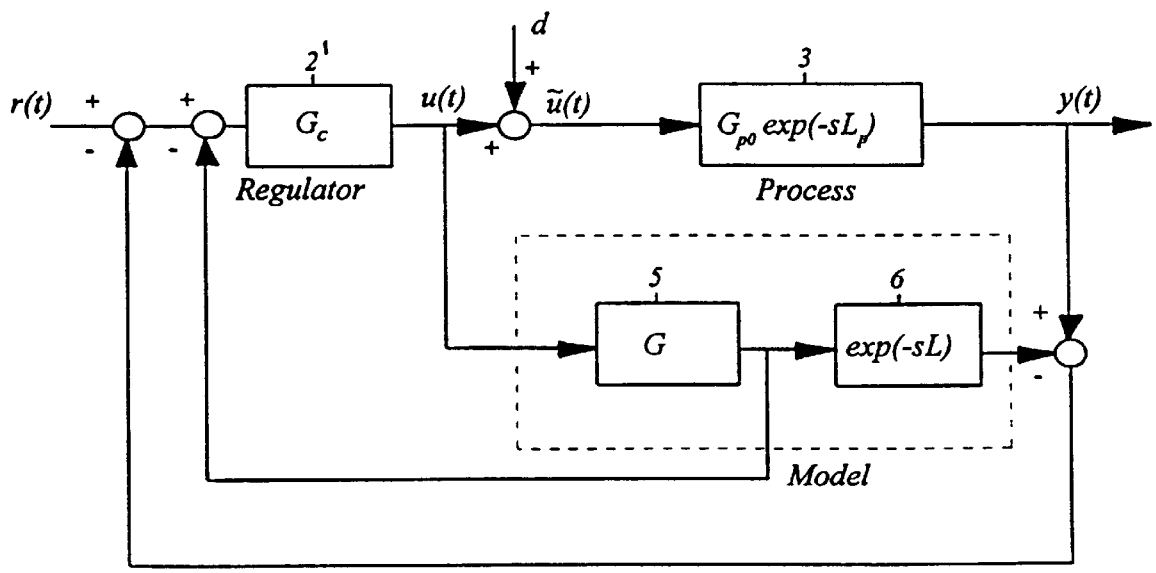
FIG. 5 is a block diagram of a Smith-predictor controller.

The following describes application of the concepts of the invention to design of a dead time compensator. Referring now to FIG. 5, the Smith Predictor control shown therein provides dead time compensation for processes having a long dead time to achieve performance enhancement. Such enhancement can be particularly achieved if the Predictor is properly tuned and adapted to dynamics changes. If the current model of the process is not in the transfer function form $G_p(s)$ but in the form of discrete frequency response $G_p(j\omega_i)$, however, the discrete frequency response can be converted into a transfer function $G_p(s)$ as hereinabove described, in the section entitled "Transfer Function Modeling", before the Smith predictor is implemented.

Once a frequency domain transfer function model for the process is available, the issue remaining with the Smith predictor is to design a primary regulator 2', having the transfer function $G_c$. In the following description, $G_{d0}$ is specified as the objective transfer function for the dead time free part of the closed-loop response. $G_{d0}$ has the same form as Eq. (11), although having the parameter value $L_p=0$, since the primary controller $G_c$ is now designed for the dead time free part $G_{p0}$ of the process, given by $$G_{p0}(s) = \frac{\beta s + 1}{\alpha_1 s^2 + \alpha_2 s + \alpha_3}, \quad (40)$$

Having recognized and obtained the above description of the primary controller, the multiple-point fitting solution described hereinabove, in the section entitled "Regulator Design", for example, is used to solve the following fitting equation, applicable to FIG. 5, $$G_{p0}(j\omega)G_c(j\omega) = \frac{G_{d0}}{1 - G_{d0}} \quad (41)$$

for $G_c$. Thus, in accordance with the invention, there are provided parameter values to enable modification and design of the Smith Predictor for the process 3, including particularly a design of a primary regulator thereof.

APPLICATION TO AUTO-TUNING OF MULTIVARIABLE REGULATORS

The following description discloses application of the inventive concept to auto-tuning of multivariable regulators.

Figure 6:
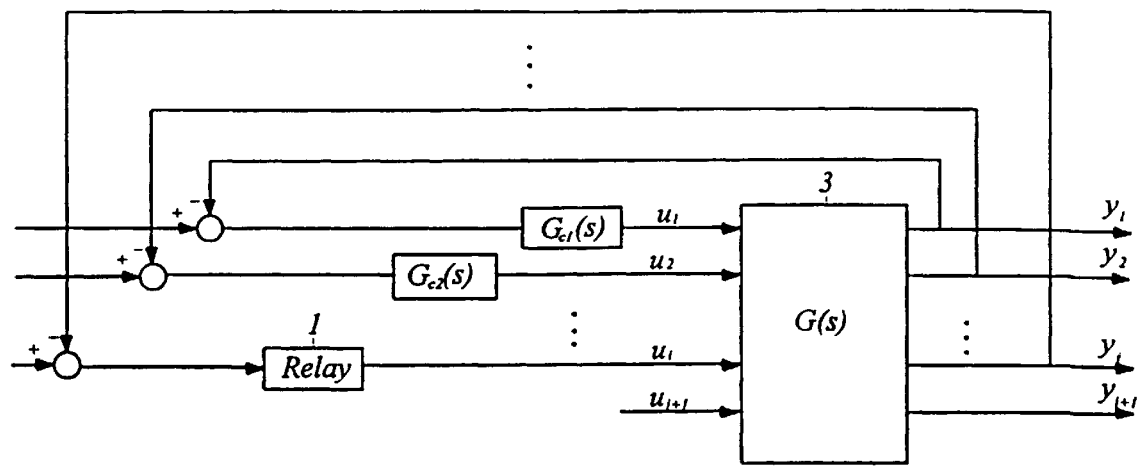
FIG. 6 is a block diagram of multivariable auto-tuning process.

Referring now to FIG. 6, illustrated therein is a multivariable process, wherein a plurality of input variables are provided to a process having a frequency domain transfer function G(s), and a plurality of outputs are obtained therefrom. Although the number of output variables and input variables are shown as equal (with i single-variable feedback loops from i individual output variables $y_1 \ldots y_i$ to i individual respective input variables $u_1 \ldots u_i$), it will be appreciated that in other applications the numbers of variables may not be equal and, moreover, the feedback loop structure may be more complicated. Such different feedback loop structures may include feedback control devices in the feedback loops which may themselves be single- or multi-variable control devices, and may provide for a plurality of output variables to be fed back to one input variable, a plurality of input variables to receive feedback from one output variable, or a combination thereof. However, in the illustrative example provided below, there is considered a linear and stable 2 by 2 process, i.e., a process to which are provided two input variables, $u_1$ and $u_2$ and from which are provided two output variables $y_1$ and $y_2$.

For illustrative purposes and to enable understanding of the invention, it is assumed that the process runs in open loop and is manually controlled to a steady state. A sequential relay feedback 1 is shown in FIG. 6 and is applied to the process 3 in order to estimate the process frequency response in a manner similar to that previously described for the single variable case. It should be appreciated that, although the following description is in terms of a relay feedback, the previously disclosed concept of applying a step function to auto-tune a single variable regulator may be utilized with the multivariable process similarly to the utilization of the relay feedback disclosed herein.

For the above noted example, the 2 by 2 process is described as $$\begin{bmatrix} Y_1(s) \\ Y_2(s) \end{bmatrix} = \begin{bmatrix} G_{p11}(s) & G_{p12}(s) \\ G_{p21}(s) & G_{p22}(s) \end{bmatrix} \begin{bmatrix} U_1(s) \\ U_2(s) \end{bmatrix}. \quad (42)$$

As an initial simplifying explanation of the method of the invention, the SISO (single-input single-output) relay tuning hereinabove described in connection with regulator tuning for the single variable implementation is applied to the first loop of the 2 by 2 system described by Eq. (42), with the second loop being open. That is, the first loop is closed with a relay feedback until a SISO regulator is tuned and operating. The relay test transients plus the subsequent control transient are recorded as $u_1(t), y_1(t), y_2(t)\}$. These transients are processed in accordance with the Identification Solution earlier described herein to obtain the FFT transformed functions $\tilde{U}_1^1(j\omega), \tilde{Y}_1^1(j\omega), \tilde{Y}_1^1(j\omega)\}$. Since only a single control $[u_1(t)]$ is provided, $u_2(t)=0$ and Eq. (42) provides an approach to obtaining a first pair of the process parameters $G_{p11}$ and $G_{p21}$ as $$G_{p11}(j\omega + \alpha) = \frac{\tilde{Y}_1^1(j\omega)}{\tilde{U}_1^1(j\omega)}, \quad (43)$$

and $$G_{p21}(j\omega + \alpha) = \frac{\tilde{Y}_2^1(j\omega)}{\tilde{U}_1^1(j\omega)}. \quad (44)$$

Next, while the first loop is kept closed, the SISO relay tuning is applied to the second loop. The resultant process inputs and outputs $u_1'(t), u_2'(t), y_1'(t), y_2'(t)\}$ are recorded and are also processed in accordance with the previously described Identification Solution to obtain $\tilde{U}_1^2(j\omega), \tilde{U}_2^2(j\omega), \tilde{Y}_1^2(j\omega), \tilde{Y}_2^2(j\omega)\}$. Then, it is possible to estimate $G_{p12}(j\omega+\alpha)$ and $G_{p22}(j\omega+\alpha)$ as $$G_{p12}(j\omega + \alpha) = \frac{\tilde{Y}_1^2(j\omega) - G_{p11}(j\omega + \alpha)\tilde{U}_1^2(j\omega)}{\tilde{U}_2^2(j\omega)}, \quad (45)$$

and $$G_{p22}(j\omega + \alpha) = \frac{\tilde{Y}_2^2(j\omega) - G_{p21}(j\omega + \alpha)\tilde{U}_1^2(j\omega)}{\tilde{U}_2^2(j\omega)}. \quad (46)$$

Figure 7:
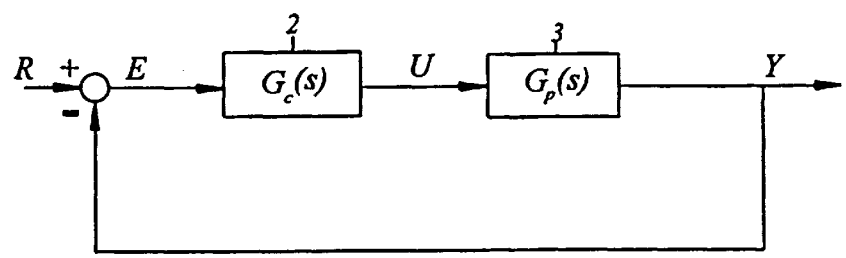
FIG. 7 is a block diagram of a multivariable control system.

In order to design the control, for illustrative purposes there is considered a multivariable regulator $$G_c = \begin{bmatrix} G_{c11} & G_{c12} \\ G_{c21} & G_{c22} \end{bmatrix}, \quad (47)$$

configured with the process as shown in FIG. 7.

It will be appreciated that for complete decoupling of the closed loop system there is required an open loop transfer matrix $G_p G_c$ which is diagonal (i.e., the elements off the diagonal in the product matrix are 0). In accordance with the invention, the off-diagonal elements in a product of a matrix multiplication of matrix $G_p$ of Eq. (42) by matrix $G_c$ of Eq. (47) are thus set to zero, thereby to establish design criteria for the multivariable regulator. Implementing this approach, it will be understood that the off-diagonal element of the product matrix $G_p G_c$ at position (2,1) is $G_{p21}G_{c11} + G_{p22}G_{c21}$. By setting this element to zero there results the first design equation, or criterion, for the control:

$$G_{p21}G_{c11} + G_{p22}G_{c21} = 0, \quad (48)$$

$$\text{or } G_{c21} = -\frac{G_{p21}G_{c11}}{G_{p22}}. \quad (49)$$

Using standard mathematical tools, it then follows that the diagonal element of $G_p G_c$ at position (1,1) is $$G_{p11}G_{c11} + G_{p12}G_{c21} = \left(G_{p11} - \frac{G_{p12}G_{p21}}{G_{p22}}\right)G_{c11} =: \tilde{G}_{p11}G_{c11} \quad (50)$$

The parameter $\tilde{G}_{p11}$ is regarded as a generalized process. Thus, $G_{c11}$ is then designed by using the SISO regulator tuning technique (earlier defined herein as Multiple-point-fitting solution) to solve the following fitting problem:

$$\tilde{G}_{p11}G_{c11} = G_{d1}, \quad (51)$$

where $G_{d1}$ is the first open-loop objective transfer function. With $G_{p21}$, $G_{p22}$ and $G_{c11}$ available, the Multiple-point-fitting solution is applied to Eq. (49), i.e.

$$G_{p22}G_{c21} = -G_{p21}G_{c11}, \quad (52)$$

to obtain $G_{c21}$.

Similarly, the multiple-point-fitting solution is applied to $$\left(G_{p22} - \frac{G_{p12}G_{p21}}{G_{p11}}\right)G_{c22} =: \tilde{G}_{p22}G_{c22} = G_{d2}, \tag{53}$$

respectively, where $G_{d2}$ is the second open-loop objective transfer function, to determine $G_{c22}$ and $G_{c12}$.

As an alternative approach to tuning the multivariable regulator $G_c$, it is possible to use a matrix version of the linear least square frequency response fitting. With this approach, the objective closed-loop transfer function matrix is chosen as $$H_d(s) = \text{diag}\{H_{d1}, H_{d2}\}, \tag{55}$$

where $H_{d1}$ and $H_{d2}$ are respectively specified in the same way as in the SISO case. The objective open-loop transfer function matrix is given by $$G_d(s) = \text{diag}\{G_{d1}, G_{d2}\} = \text{diag}\left\{\frac{H_{d1}}{1-H_{d1}}, \frac{H_{d2}}{1-H_{d2}}\right\}. \tag{56}$$

With the shifted process frequency response matrix $G_p$ available and the objective loop described in Eq. (53), the multivariable regulator $G_c$ is designed such that $G_pG_c$ is fitted to $G_d$ as well as possible. To this end, a candidate for $G_c$ is provided as a multivariable PID:

$$G_c(s) = K_P + K_I \frac{1}{s} + K_D s = \begin{bmatrix} I & \frac{1}{s} & s \end{bmatrix} \begin{bmatrix} K_P \\ K_I \\ K_D \end{bmatrix} \tag{57}$$

The fitting equation to be solved is $$G_p(j\omega_i+\alpha)G_c(j\omega_i+\alpha)=G_d(j\omega_i+\alpha), i=1, 2, \ldots, m. \tag{58}$$

In view of Eq. (57), Eq. (58) can be rearranged into real linear equations:

$$AX=B, \tag{59}$$

where A contains frequency response data from $\tilde{G}_p = G_p[I \ 1/s \ sI]$, B from $G_d$, and X contains the multivariable PID settings.

Thus, the invention obtains an optimal solution for X and, again, the solution is obtained with the linear least square method.

As hereinabove noted, the inventive tuning method can be extended to a general m input m output system with minor modifications as follows. For frequency response identification, after the first k sequential relay tests have been done, and their loops have been closed with the decentralized regulators which are tuned as described in the foregoing, the (k+1)th loop is put into a relay feedback. For such a configuration, all the k regulators and relay outputs $u_j(t), j=1, \ldots, k, k+$, as well as the process outputs $y_i(t), i=1,$ ..., m, are recorded until the system reaches a stationary state. At that time there results a description of the system as $$\begin{bmatrix} G_{p1,k+1}(j\omega+\alpha) \\ \vdots \\ G_{pm,k+1}(j\omega+\alpha) \end{bmatrix} = \begin{bmatrix} \left(\tilde{Y}_1^{k+1}(j\omega) - \sum_{j=1}^{k} G_{p1,j}(j\omega+\alpha)\tilde{U}_j^{k+1}(j\omega)\right) / \tilde{U}_{k+1}^{k+1}(j\omega) \\ \vdots \\ \left(\tilde{Y}_m^{k+1}(j\omega) - \sum_{j=1}^{k} G_{pm,j}(j\omega+\alpha)\tilde{U}_j^{k+1}(j\omega)\right) / \tilde{U}_{k+1}^{k+1}(j\omega) \end{bmatrix}. \tag{60}$$

In this way, the shifted frequency responses $G_p(j\omega+\alpha)$ of an m-input and m-output multivariable process is determined after m relay tests.

For control design, the relationship between diagonal and off diagonal elements of a multivariable controller which inherently achieves complete decoupling of the system can be derived from the foregoing. As a demonstration, let an m-input and m-output ("m by m") system be represented by the following "b 2by 2" system $$\begin{bmatrix} Y_1(s) \\ \overline{Y}_2(s) \end{bmatrix} = \begin{bmatrix} G_{p11}(s) & \overline{G}_{p12}(s) \\ \overline{G}_{p21}(s) & \overline{G}_{p22}(s) \end{bmatrix} \begin{bmatrix} U_1(s) \\ \overline{U}_2(s) \end{bmatrix}, \tag{61}$$

where $\overline{Y}_2(s)$, $\overline{U}_2(s)$, $\overline{G}_{p12}(s)$, $\overline{G}_{p21}(s)$ $\overline{G}_{p22}(s)$ are matrices with dimensions of m×1, m×1, 1×(m−1), (m−1)×1, (m−1)×(m−1) respectively, and let the multivariable regulator be represented as $$\begin{bmatrix} G_{c11} & \overline{G}_{c12} \\ \overline{G}_{c21} & \overline{G}_{c22} \end{bmatrix}, \tag{62}$$

where $\overline{G}_{c12}(s), \overline{G}_{c21}(s), \overline{G}_{c22}(s)$ are matrices with dimensions 1×(m−1), (m−1)×1, (m−1)×(m−1) respectively. Although the results are easier to visualize for the illustrative 2 by 2 system, it should be appreciated that, from a mathematical viewpoint, the considerations and results are substantially the same for systems where m>2.

For complete decoupling of the closed-loop, the off-diagonal element of $G_pG_c$ at column 1 is $$\overline{G}_{p21}G_{c11} + \tilde{G}_{p22}\overline{G}_{c21} = 0. \tag{63}$$

Thus, for decoupling the parameters of the regulator and the process should be related as follows:

$$\overline{G}_{c21} = -\tilde{G}_{p22}^{-1}\overline{G}_{p21}G_{c11}. \tag{64}$$

It thus follows that the diagonal element of $G_pG_c$ at position (1,1) is $$G_{p11}G_{c11} + \tilde{G}_{p12}\overline{G}_{c21} = (G_{p11} - \tilde{G}_{p12}\overline{G}_{p22}^{-1}\overline{G}_{p21})G_{c11} =: \tilde{G}_{p11}G_{c11}. \tag{65}$$

The parameter $\overline{G}_{p11}$ is regarded as a generalized process. Thus, $G_{c11}$ is then designed by using the SISO regulator tuning technique (earlier defined herein as Multiple-point-fitting solution). With $\overline{G}_{p21}$, $\overline{G}_{p22}$ and $G_{c11}$ available, the Multiple-point-fitting solution is applied to Eq. (64) to obtain each element of $\overline{G}_{c21}$. Similarly, the other columns of $G_c$ are determined.

As hereinabove noted with respect to Eq. (54), as an alternative approach to tuning the multivariable regulator $G_c$, it is possible to use a matrix version of the linear least square frequency response fitting for the case of a general m-input and m-output multivariable processes.

APPLICATION TO AUTO-TUNING OF MULTIVARIABLE SMITH PREDICTORS

As previously noted herein, for processes with long dead time, a Smith Predictor (shown in FIG. 5) can achieve performance enhancement if it is properly tuned. With the shifted frequency responses of multivariable process $G_p(j\omega+\alpha)$ available in the foregoing description of auto-tuning of multivariable regulators, the algorithm used hereinabove in the estimation of process frequency response is applied to each element of $G_p(j\omega+\alpha)$ to obtain the process frequency response $G_p(j\omega)$, and is converted into transfer function model $G_p(s)$ with the algorithm given in Section 6.

To design the primary controller $G_c$ for the dead time free part $G_0(s)$ of the model $G_p(s)$, which is determined as $$G_0(s) = G_p(s)|_{L_{ij}^{-0}},$$

$G_{d0}$ is specified as the objective transfer function matrix for the open-loop dead time free response. The algorithm described above in conjunction with auto-tuning of multivariable regulators is used to determine the primary controller $G_c$.

CONCLUSIONS

Although various algorithms are described in the foregoing, it should be appreciated that the invention claimed herein is limited by the claims rather than the disclosure. Thus, rather than claiming a mathematical algorithm, the claims recite a method and apparatus for designining and implementing single- and multi-variable regulators and Smith Predictors for single- and multi-variable processes. The mathematical algorithms, involving specific transforms, matrix multiplication and matrix inversion, for example, are used as tools operating in combination to attain the desired objects of the invention. Thus, while mathematical equations may provide an efficient manner of describing the inventive concepts, the invention does not pre-empt the mathematical algorithms disclosed herein, per se, but rather the applications thereof to produce a useful and unobvious control apparatus.

Indeed, the method of the invention may be implemented by a programmed computer or processor, programmed to carry out the various computations hereinabove described by implementing a sequence of instructions controlling its operations and stored in a memory, such as a RAM, a ROM, a recording medium (whether of a magnetic, optical or another type). Moreover, upon identifying the necessary parameters of the regulators, Smith Predictors, and the like designed in accordance with the invention, it should be recognized that such regulators and predictors themselves may be implemented by programmed processors, as well as by electronic devices, utilizing discrete components having values selected to conform with the parameters provided in accordance with the invention.

The inentive apparatus, when operating to obtain the various parameters in accordance with the foregoing principles, has the following significant features, among others which help to distinguish the invention from existing adaptive controllers.

A simultaneous and accurate multiple-point process frequency response estimation is provided with an appropriate use of the FFT.

Both setpoint changes and load disturbances responses are used for identification and adaptive control.

The process transient data are batch-processed and the model and controller are updated only after the transient is completed.

An optimal multiple-point frequency response fitting solution is provided for regulator tuning.

Transfer function models are provided when a dead time compensator or other model-based advanced controllers are required.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

We claim:

1. A method for auto-tuning a regulator for a process, comprising the steps of:

(a) applying a perturbation to the process;

(b) observing input signals to the process which correspond to said perturbation and output signals of the process resulting from the applied perturbation;

(c) modifying said input and output signals for rendering said signals fully integrable and hence Fourier transformable;

(d) performing a FFT (Fast Fourier Transformation) of the integrable input and output signals to obtain a plurality of points on a frequency response curve of the process;

(e) using an optimal multiple point fitting method for automatically selecting parameters of a regulator structure based on the points on the frequency response curve; and (f) tuning the regulator for the process in accordance with the parameters selected by the optimal multiple-point fitting method.

2. The method for auto-tuning a regulator as recited in claim 1, wherein said step of modifying said signals comprises decomposing said signals into a periodic and a decay component, and the step of introducing a decay exponential or factor to said signals.

3. The method for auto-tuning a regulator as recited in claim 1, wherein:

a) said step of modifying said signals comprises introducing a decay exponential or factor to said signals to render the signals fully integrable; and b) said step of performing a FFT results in obtaining a plurality of points on a shifted frequency response curve of the process.

4. The method for auto-tuning a regulator as recited in claim 3, further comprising the steps of:
   a) performing an inverse FFT on the shifted frequency response curve of the process to obtain an inversely transformed signal,
   b) removing the decay exponential from the inversely transformed signal to obtain a modified inversely transformed signal, and
   c) performing a FFT on the inversely transformed signal to obtain the frequency response curve of the process.

5. The method for auto-tuning a regulator as recited in claim 1, wherein said step of using an optimal multiple point fitting method comprises applying a least squares point fitting method for selecting said parameters of the regulator structure.

6. The method for auto-tuning a regulator as recited in claim 1, comprising the further step of continually varying the regulator by:
   (a) monitoring process transients representative of changes in process set point or load;
   (b) upon detecting a significant transient, repeating the following steps of:
      (i) estimating a plurality of points on a changed frequency response curve of the changed process from the transient for obtaining a transfer function for the changed process;
      (ii) using an optimal multi-point fitting method for automatically selecting parameters of the regulator structure based on the estimated frequency response points for the changed process; and
      (iii) automatically tuning the regulator for the changed process in accordance with the parameters selected by the optimizing multi-point fitting method, thereby providing a continually adaptive variation of the process regulator.

7. The method for auto-tuning a regulator as recited in claim 2, comprising the further step of continually varying the regulator by:
   (a) monitoring process transients representative of changes in process set point or load;
   (b) upon detecting a significant transient, repeating the following steps of:
      (i) estimating a plurality of points on a changed frequency response curve of the changed process from the transient for obtaining a transfer function for the changed process;
      (ii) using an optimal multi-point fitting method for automatically selecting parameters of the regulator structure based on the estimated frequency response points for the changed process; and
      (iii) automatically tuning the regulator for the changed process in accordance with the parameters selected by the optimizing multi-point fitting method, thereby providing a continually adaptive variation of the process regulator.

8. The method for auto-tuning a regulator as recited in claim 3, comprising the further step of continually varying the regulator by:
   (a) monitoring process transients representative of changes in process set point or load;
   (b) upon detecting a significant transient, repeating the following steps of:
      (i) estimating a plurality of points on a changed frequency response curve of the changed process from the transient for obtaining a transfer function for the changed process;
      (ii) using an optimal multi-point fitting method for automatically selecting parameters of the regulator structure based on the estimated frequency response points for the changed process; and
      (iii) automatically tuning the regulator for the changed process in accordance with the parameters selected by the optimizing multi-point fitting method, thereby providing a continually adaptive variation of the process regulator.

9. The method for auto-tuning a regulator as recited in claim 6, wherein said step of estimating a plurality of points on a changed frequency response curve comprises performing a FFT of changed input and output signals to obtain said points on the changed frequency response curve.

10. The method for auto-tuning a regulator as recited in claim 7, wherein said step of estimating a plurality of points on a changed frequency response curve comprises performing a FFT of changed input and output signals to obtain said points on the changed frequency response curve.

11. The method for auto-tuning a regulator as recited in claim 8, wherein said step of estimating a plurality of points on a changed frequency response curve comprises performing a FFT of changed input and output signals to obtain said points on the changed frequency response curve.

12. A method for auto-tuning a regulator for a multivariable process having a plurality of inputs and a plurality of outputs, comprising the steps of:
   (a) applying a sequence of perturbations to said plurality of inputs of the process;
   (b) observing an input transient signal resulting from application of a perturbation to one of said plurality of inputs and observing a plurality of output transient signals resulting therefrom, and repeating said observing step upon application of a perturbation to another of said plurality of inputs;
   (c) modifying said input transient signals and said output transient signals for rendering said transient signals fully integrable and hence Fourier transformable;
   (d) performing a FFT (Fast Fourier Transformation) of the integrable transient signals to obtain a plurality of points on a plurality of frequency response characteristics from individual inputs to individual outputs of the process for obtaining a plurality of transfer functions for the multivariable process;
   (e) automatically selecting parameters of multivariable regulator structures based on the points on the frequency response characteristics by using an optimal multiple point fitting method; and
   (f) tuning the multivariable regulator structures for the multivariable process in accordance with the parameters selected by the optimal multiple-point fitting method.

13. The method of claim 12 wherein said step of automatically selecting parameters of the multivarable regulator structures is based on a decoupling condition and on processes equivalent thereto.

14. The method of claim 12 wherein said step of automatically selecting parameters of the multivarable regulator structures is based on a matching between an open-loop transfer matrix and an objective matrix.

15. A method for auto-tuning a regulator for a process having a long deadtime using Smith Predictor control, comprising the steps of:
   (a) applying a perturbation to the process;
   (b) observing input signals to the process which correspond to said perturbation and output signals of the process resulting from the applied perturbation;

(c) modifying said input and output signals for rendering said signals fully integrable and hence Fourier transformable;

(d) performing a FFT (Fast Fourier Transformation) of the integrable input and output signals to obtain a plurality of points on a frequency response curve of the process;

(e) obtaining a transfer function model of the process from an identified frequency response;

(f) using an optimal multiple point fitting method for automatically selecting parameters of a regulator structure based on the points on the frequency response curve;

(g) applying the optimal fitting method to a dead-time free part of said transfer function model for automatically selecting parameters of the regulator; and (h) tuning the regulator for the process by using said transfer model as a predictor, and (i) using said regulator as the primary controller.

16. The method of claim 1, wherein said step of applying a perturbation comprises applying a step function to an input of the process.

17. The method of claim 1, wherein said step of applying a perturbation comprises applying a relay test to the process.

18. The method of claim 1, wherein said steps of performing a FFT, using an optimal multiple point fitting method and selecting parameters of a regulator structure are implemented using a computer.

19. The method of claim 1, wherein said steps of performing a FFT, using an optimal multiple point fitting method and selecting parameters of a regulator structure are implemented by a program in a medium.

* * * * *